United States Patent [19]

Oosaka et al.

[11] 4,054,360
[45] Oct. 18, 1977

[54] APPARATUS FOR REMOVING THE SCANNING ERROR DUE TO AN ERROR IN PARALLELISM OF A ROTARY POLYHEDRAL MIRROR

[75] Inventors: Shigenori Oosaka; Akihiro Ohga, both of Asaka, Japan

[73] Assignee: Fuji Photo Film Co., Ltd., Minami-ashigara, Japan

[21] Appl. No.: 653,565

[22] Filed: Jan. 29, 1976

[30] Foreign Application Priority Data

Jan. 31, 1975   Japan .................................. 50-13073

[51] Int. Cl.² ............................................. G02B 27/17
[52] U.S. Cl. ........................................ 350/7; 350/285
[58] Field of Search .............. 350/7, 6, 285; 178/7.6; 324/97; 352/106–109

[56] References Cited

U.S. PATENT DOCUMENTS

| | | | |
|---|---|---|---|
| 3,212,100 | 10/1965 | Buck | 324/97 |
| 3,750,189 | 7/1973 | Fleischer | 350/7 |
| 3,771,850 | 11/1973 | Casler | 350/6 |
| 3,865,465 | 2/1975 | Tatuoka et al. | 350/7 |
| 3,897,132 | 7/1975 | Meeussen et al. | 350/7 |

*Primary Examiner*—Jon W. Henry
*Attorney, Agent, or Firm*—Sughrue, Rothwell, Mion, Zinn and Macpeak

[57] ABSTRACT

An improved method and apparatus for removing the scanning error due to imperfect parallelism of a rotary polyhedral mirror is disclosed. An incident beam of light initially deflected by the rotary polyhedral mirror is directed along an optical path which brings it back into incidence on the same deflection point on the mirror. The double deflection causes the second reflected beam to travel a path which is vertically independent of the error in parallelism, while at the same time not interfering with the horizontal scanning of the second reflected beam.

2 Claims, 6 Drawing Figures

APPARATUS FOR REMOVING THE SCANNING ERROR DUE TO AN ERROR IN PARALLELISM OF A ROTARY POLYHEDRAL MIRROR

BACKGROUND OF THE INVENTION

1. Field of the Invention

The present invention relates to an improved method and apparatus for deflecting light using a rotary polyhedral mirror.

2. Description of the Prior Art

Various devices and methods are known in the art for scanning a beam of light, such as laser light, over a record medium for the purpose of reading and recording information. A rotary polyhedral mirror is one kind of light deflector used in such devices. Unfortunately, however, even if the rotary polyhedral mirror is made with the highest degree of precision, there will still be an error in parallelism between its rotary axis and the mirror surfaces. Since, an error in parallelism causes the beam of light to be deviated in a direction which is at right angles to the scanning direction, the loci of scanning lines due to the mirror surfaces of the rotary polyhedral mirror will not coincide. The longer the length of the light path from the mirror to the scanning surface, the greater the deviation of the scanning lines as a result of the error in parallelism.

Several systems have been proposed to optically correct the latter problem. For example, according to the invention disclosed in the specification of Japanese Patent Laid-Open No. 33,624/ 1972, the amount of correction needed to compensate for errors in parallelism in the mirror surfaces of the rotary polyhedral mirror is pre-measured and stored in a memory. Thereafter, in synchronism with rotation of the rotary polyhedral mirror, a separately installed light deflector is driven by a signal from the memory to thereby eliminate the deviation of the scanning line of the light beam. One disadvantage of the latter system is that it requires a complicated device for driving the light deflector in response to the signal from the memory.

Further, in the invention disclosed in the specification of Japanese Patent Laid-Open No. 98,844/1973, corresponding to Fleischer U.S. Pat. No. 3,750,189, issued July 31, 1973, two cylindrical lenses are employed to form an optical system, wherein a deflection point and a scanning surface screen are an object point and an image point, to thereby remove the deviation of the scanning line due to the error in parallelism. This system has a disadvantage, in which an error in parallelism is corrected only at the image point.

SUMMARY OF THE INVENTION

It is an object of the present invention to provide a method and apparatus for deflecting light, whih eliminates deviation of the scanning lines normally caused by errors in parallelism of a rotary polyhedral mirror.

In accordance with the present invention, a beam of light deflected off a mirror surface of the polyhedral mirror will be deflected vertically due to the error in parallelism of the mirror surface. The deflected beam is caused to travel a path which will bring it into incidence with the same deflection point of the mirror in exactly the reverse path of the original deflected path. As a result the second deflection from said same deflection point will be vertically constant irrespective of the error in parallelism.

The method and apparatus of the invention will be apparent from the following illustrative embodiments taken in connection with the accompanying drawing wherein:

DETAILED DESCRIPTION OF THE PREFERRED EMBODIMENTS

Before referring to the figures in detail certain points should be noted for understanding the description that follows. For purposes of establishing reference directions and planes, it will be assumed that the rotational axis of the polyhedral mirror is positioned vertically. Therefore a line of reflected light will scan a horizontal line on the surface of a record medium. Rotation of the mirror causes the reflected beam of light to scan the horizontal line. However if the mirror surface is not perfectly parallel with the vertical axis, the beam will be deflected in the vertical direction and the resulting line scanned on the record medium will be displaced vertically from the desired scanned line position. The plane defined by the actual scanned line and the deflection point on the mirror is referred to herein as the deflection surface. It will be apparent that the deflection surface will form an angle with a perfect horizontal plane dependent upon the error of parallelism. The deflection point is the point on the rotary mirror where the incident light beam is reflected. Finally, as anyone will surely recognize, the terms vertical and horizontal are used in a purely relative sense and are not intended to refer to directions perpendicular to and parallel to the surface of the earth.

Figure 1A:
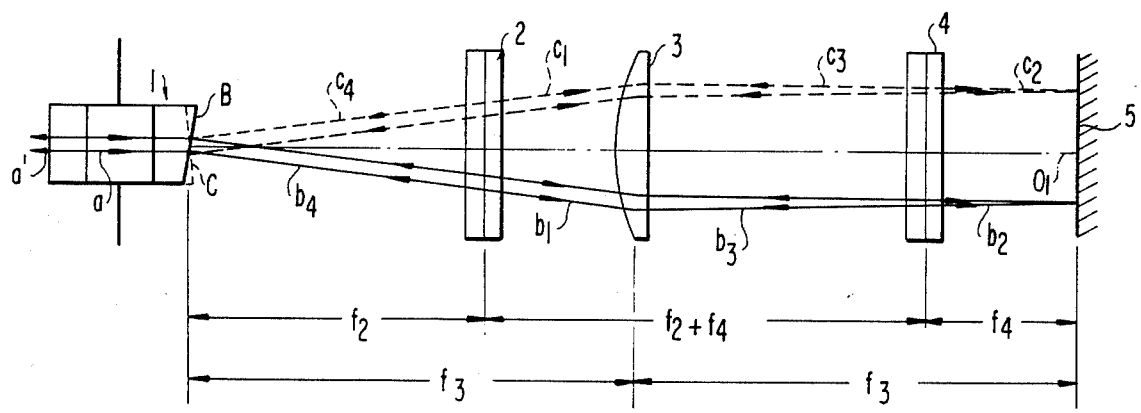
FIGS. 1(a), 1(b) and 1(c) are a side view, a top view, and a perspective view, respectively, of an optical system illustrating apparatus and a method according to one embodiment of the present invention.
Figure 1B:
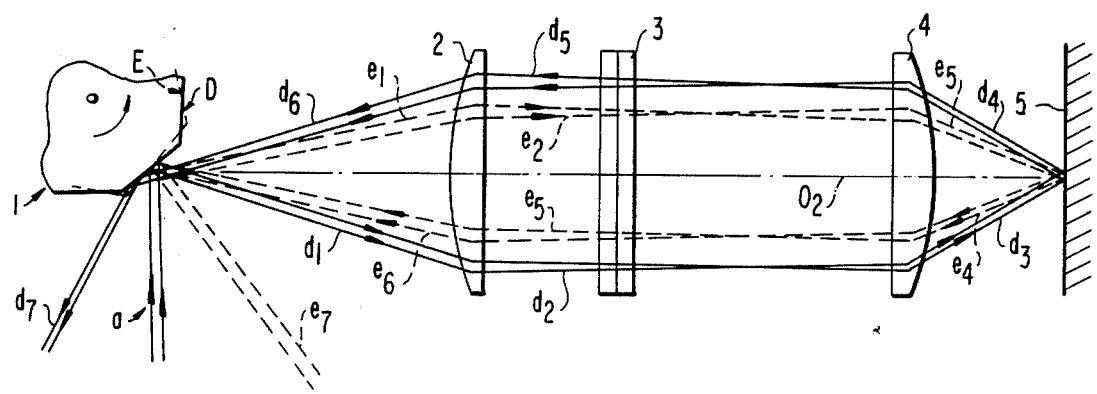

In FIG. 1(a), the rotary polyhedral mirror is shown at 1. The lines B and C represent two different angles of the mirror surface with respect to a perfect vertical plane. The figure illustrates that according to the invention the vertical position of the second reflected beam, $a'$, will be independent of the error in parallelism; i.e., the beam $a'$ will be the same whether the mirror is at an angle of B or C with the vertical plane. In FIG. 1(b), the horizontal scanning of the second reflected beam of light is illustrated.

Figure 1C:
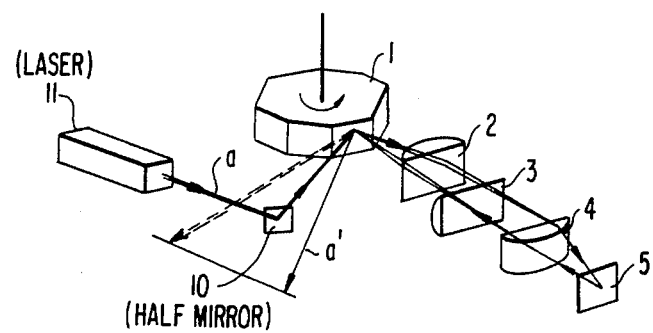

In FIGS. 1(a), 1(b) and 1(c), the light path includes a rotary polyhedral mirror 1, cylindrical lenses 2, 3 and 4, and a plane mirror 5. The incident light beam $a$ is shown as emanating from a laser 11 and reflecting from a half mirror 10. The half mirror permits the scanned beam of light $a'$ to pass therethrough without reflection. Reference characters $O_1$ and $O_2$ denote optical axes; the optical axis $O_1$ being set in a plane perpendicular to the rotary axis of the rotary polyhedral mirror, and the optical axis $O_2$ set approximately in the center of the scanned deflection range in a vertical plane parallel to the rotary axis. The cylindrical lenses 2 and 4 are arranged perpendicularly to the optical axis so as to affect the horizontal convergence and divergence of the light beams, and the cylindrical lens 3 is also arranged perpendicularly to the optical axis so as to affect the vertical convergence and divergence of the light beam. The plane mirror 5 is also arranged perpendicularly to the optical axes $O_1$ and $O_2$. The cylindrical lens 2 with a focal distance $f_2$ is positioned at a distance of $f_2$ from a light beam reflecting point P on the rotary polyhedral mirror, the cylindrical lens 3 with a focal distance $f_3$ is positioned at a distance of $f_3$ from the reflecting point P, the plane mirror 5 is positioned at a distance of $f_3$ from the cylindricallens 3, and the cylindrical lens 4 with a focal distance $f_4$ is positioned at a distance of $f_2 + f_4$ from the cylindrical lens 2 and a distance of $f_4$ from the plane mirror 5.

The deviation of the light beam in the vertical direction due to the error in parallelism will now be explained in reference to FIG. 1(a).

A parallel incident light beam $a$ is reflected at point P of a mirror surface B which is assumed not parallel to the rotary axis of the rotary polyhedral mirror. The reflected beam is inclined vertically downward to form a parallel light beam $b_1$, which is then formed into a light beam $b_2$ which is parallel to the optical axis $O_1$ and converged onto the plane mirror 5 by means of the cylindrical lens 3. This light beam is reflected by the plane mirror 5 and formed into a light beam $b_3$ of the same shape as that of the light beam $b_2$, and incident on the cylindrical lens 3, after which it is formed into a parallel light beam $b_4$ of the same shape as that of the light beam $b_1$ and returned to the mirror surface B, finally forming a parallel light beam $a'$ within the same horizontal plane as incident light beam $a$, i.e., incident beam $a$ and double reflected beam $a'$ are at the same vertical level. If the error in parallelism were such as to result in the mirror surface C, which is oppositely inclined to mirror surface B, the incident beam $a$ would also be formed into the parallel light beam $a'$ in a similar manner passing through light paths $c_1$, $c_2$, $c_3$ and $c_4$. That is, the light beam twice reflected by the mirror surface with the error in parallelism will always be at the same vertical level as the incident light beam, and hence, the deviation of the light beam in the vertical direction due to the error in parallelism does not exist in the twice reflected beam.

In the following, the light path of light beam in the horizontal plane will be explained with reference to FIG. 1(b). As can be seen from the figure, although the apparatus corrects the unwanted vertical deviation, it has no effect on the desirous horizontal scanning of the beam. The parallel incident light beam $a$ is reflected by a mirror surface D when the rotary polyhedral mirror is in a certain rotated position and formed into a parallel light beam $d_1$, which is then formed into a light beam $d_2$ which is parallel to the optical axis $O_2$ by means of the cylindrical lens 2. The beam $d_2$ is formed into a parallel light beam $d_3$ by means of the cylindrical lens 4 and is incident on the optical axis position on the plane mirror 5. The light beam reflected by the plane mirror 5 is formed into light beams $d_4$, $d_5$ and $d_6$ which is symmetrical with incident light beams $d_3$, $d_2$ and $d_1$, relative to the optical axis $O_2$, and is incident on the mirror surface D, by which said beam is again reflected and formed into a light beam $d_7$. Further, a light beam, which is in a further rotated position and reflected by a mirror surface E, also passes light paths $e_1$, $e_2$, $e_3$, $e_4$, $e_5$ and $e_6$, after which it is formed into a light beam $e_7$. That is, the light beam reflected by the different mirror surface is deflected in a different direction so that the optical system as described above does not interfere with the horizontal scanning of the light beam.

Figure 2A:
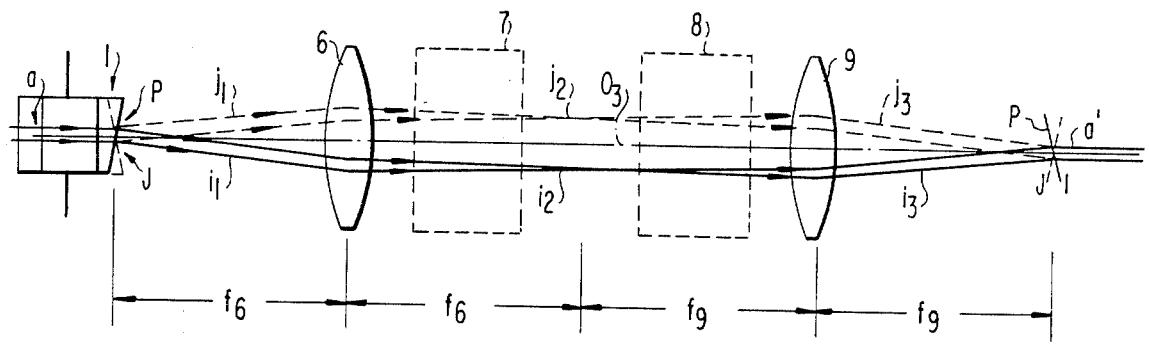
FIGS. 2(a), 2(b) and 2(c) are a side view, a top view, and a perspective view, respectively, of an optical system illustrating apparatus and a method according to another embodiment of the present invention.
Figure 2B:
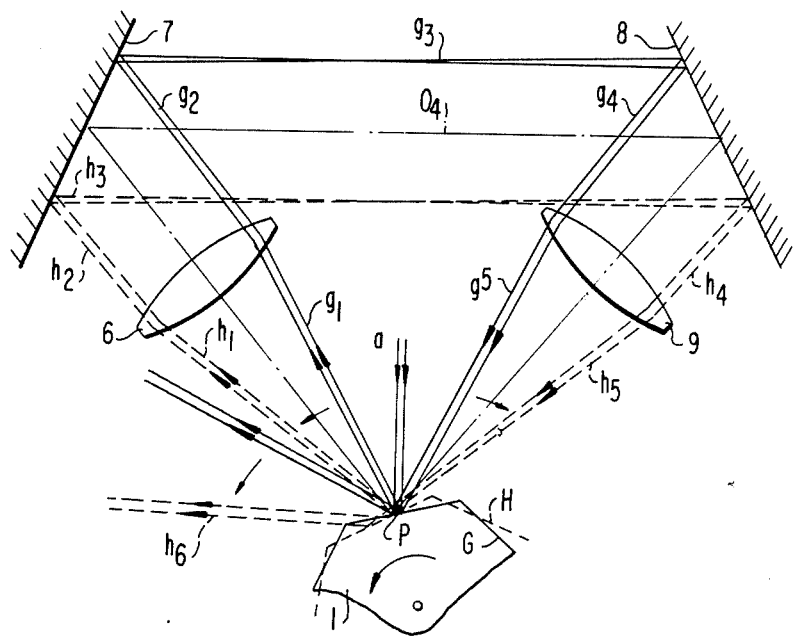
Figure 2C:
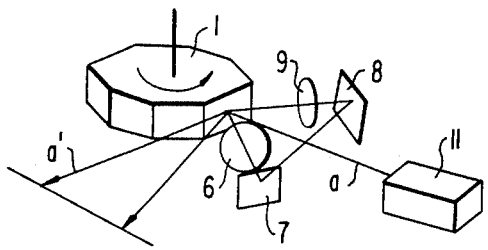

FIGS. 2(a), 2(b) and 2(c) are a side view, a plan view, and a perspective view, respectively, of an optical system in accordance with a second embodiment. It should be understood, however, that, for ease of explanation, the optical axis is straightened in FIG. 2(a), i.e., points P in FIG. 2(a) are really a single deflection point. The optical system comprises optical axes $O_3$ and $O_4$, lenses 6 and 9, having focal distances $f_6$ and $f_9$, respectively, ($f_6 = f_9$), and plane mirrors 7 and 8. As shown, the lenses are arranged at their respective focal distances from the rotary polyhedral mirror surface, the optical distance between the lenses being twice the focal distance. In FIG. 2(a), a parallel incident light beam $a$ is reflected by a mirror surface I not in parallel to the rotary axis of the rotary polyhedral mirror and is incident on the lens 6 as the parallel light beam $i_1$, which is then incident on the lens 9 as the light beam $i_2$ parallel to the optical axis $O_3$ by means of the lens 6 and further incident as the light beam $i_3$ parallel to the optical axis of the mirror surface I by means of the lens 9, after which said beam is formed by means of the mirror surface into a parallel light beam $a'$ at the same vertical level as that of the parallel incident light beam $a$. Similarly, the light beam reflected by an oppositely inclined mirror surface J also passes through light paths $j_1$, $j_2$ and $j_3$ and is formed into the parallel light beam $a'$. That is, the light beam reflected by the mirror surface having an error in parallelism is always reflected to be at the same vertical level as that of the incident light beam so that the deviation of the light beam in the vertical direction due to the error in parallelism is corrected.

FIG. 2(b) is an explanatory view of the light path of the light beam in the horizontal plane. Similarly to the case shown in FIG. 1(b), the light beam deflected by the mirror surface G passes through light paths $g_1$, $g_2$, $g_3$, $g_4$ and $g_5$ and is again reflected by the mirror surface G into a light beam $g_6$, whereas the light beam reflected by the mirror surface H in a further rotated position passes through light paths $h_1$, $h_2$, $h_3$, $h_4$ and $h_5$ and is again reflected by the mirror surface H into a light beam $h_6$.

While certain present preferred embodiments of the invention have been described, it is to be understood that the invention is not limited thereto but may be otherwise variously embodied.

What is claimed is:

1. Apparatus for eliminating the vertical deviation of a horizontally scanned beam of light caused by errors in parallelism of a rotary polyhedral mirror having mirror surfaces and an axis of rotation, said axis of rotation and the scanning direction being relatively vertical and horizontal, respectively, the improvement comprising, optical means comprising mirror means and lens means for directing a beam of light, once reflected from a deflection point on said polyhedral mirror surface, back to said deflection point at the same vertical angle of incidence but different horizontal angle of incidence as that of said once reflected beam, whereby said beam after a second reflection from said deflection point will have a horizontal direction dependent upon the rotational position of said polyhedral mirror and a vertical direction independent of said rotational position or said error in parallelism, said optical means comprises, first and second cylindrical lenses positioned to affect only the horizontal direction of light beams passing therethrough, said first lens being positioned at a distance from said deflection point equal to the focal distance of said lens, a mirror positioned a focal distance away from said second lens, said first and second lenses being positioned between said polyhedral mirror and said mirror and separated by a distance equal to the sum of the focal lengths of said first and second lenses, and a third cylindrical lens positioned to affect only the vertical direction of the light beams passing therethrough, said third lens positioned equidistance between said polyhedral mirror and said mirror and having a focal length equal to said distance.

2. Apparatus for eliminating the vertical deviation of a horizontally scanned beam of light caused by errors in parallelism of a rotary polyhedral mirror having mirror surfaces and an axis of rotation, said axis of rotation and the scanning direction being relatively vertical and horizontal, respectively, the improvement comprising, optical means comprising mirror means and lens means for directing a beam of light, once reflected from a deflection point on said polyhedral mirror surface, back to said deflection point at the same vertical angle of incidence but different horizontal angle of incidence as that of said once reflected beam, whereby said beam after a second reflection from said deflection point will have a horizontal direction dependent upon the rotational position of said polyhedral mirror and a vertical direction independent of said rotational position or said error in parallelism wherein said optical means comprises first and second substantially identical positive lenses positioned at their focal distances from said deflection point, the axes of said lenses forming equal angles but opposite angles with an imaginary plane including said rotational axis, a pair of plane mirrors each positioned behind a respective one of said lenses relative to said deflection point to cause a beam of light once deflected from said deflection point and passing through said first lens to be reflected successively from said pair of plane mirrors and to pass through said second lens and to be incident upon said deflection point, said optical distance between said first and second lenses along a path including said pair of plane mirrors equals twice the focal length of each said lens.

* * * * *